Nov. 15, 1949   R. H. MORGAN ET AL   2,488,315
EXPOSURE SELECTING DEVICE FOR X-RAY APPARATUS
Filed May 15, 1946                              2 Sheets-Sheet 1
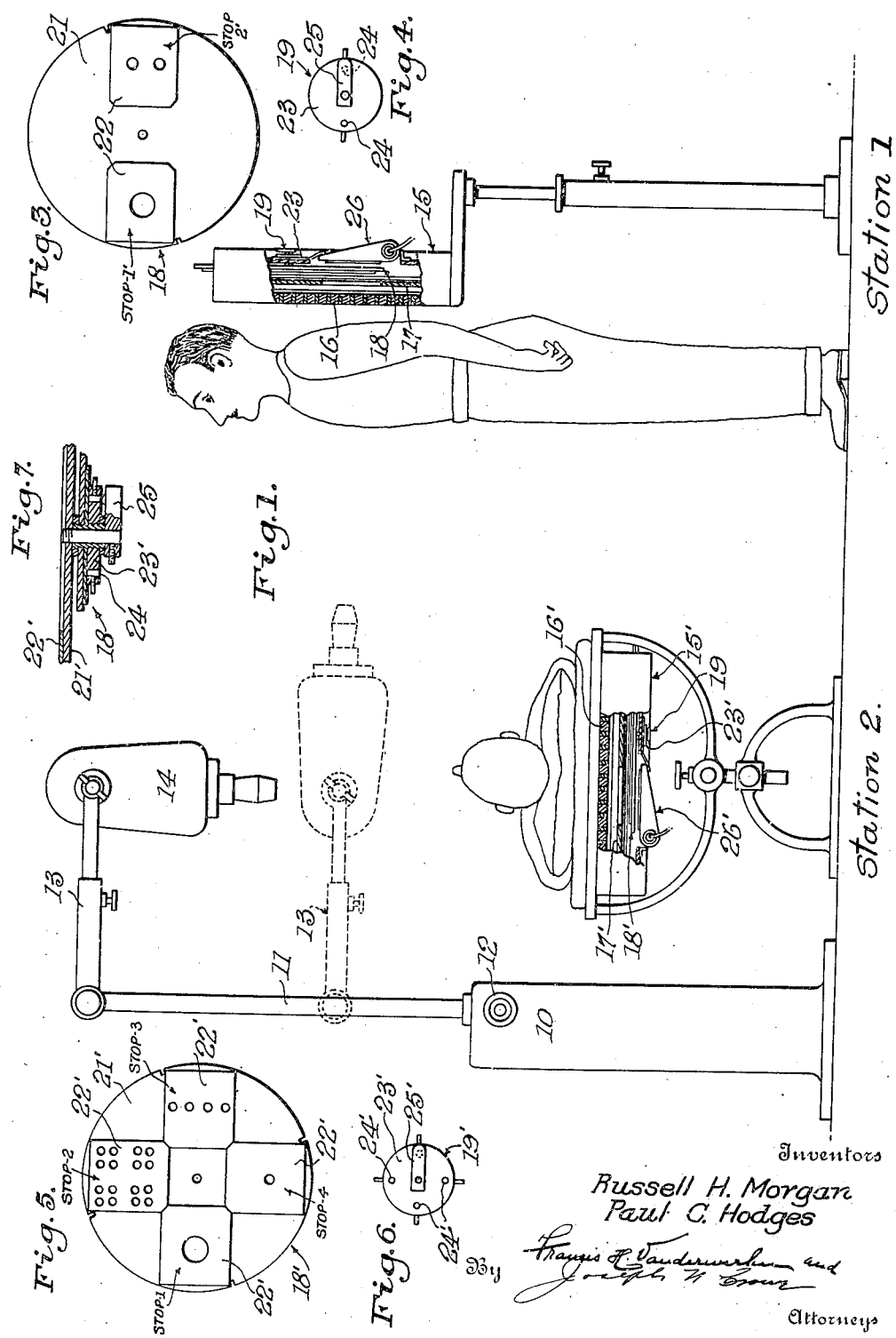
Inventors
Russell H. Morgan
Paul C. Hodges
By
Attorneys

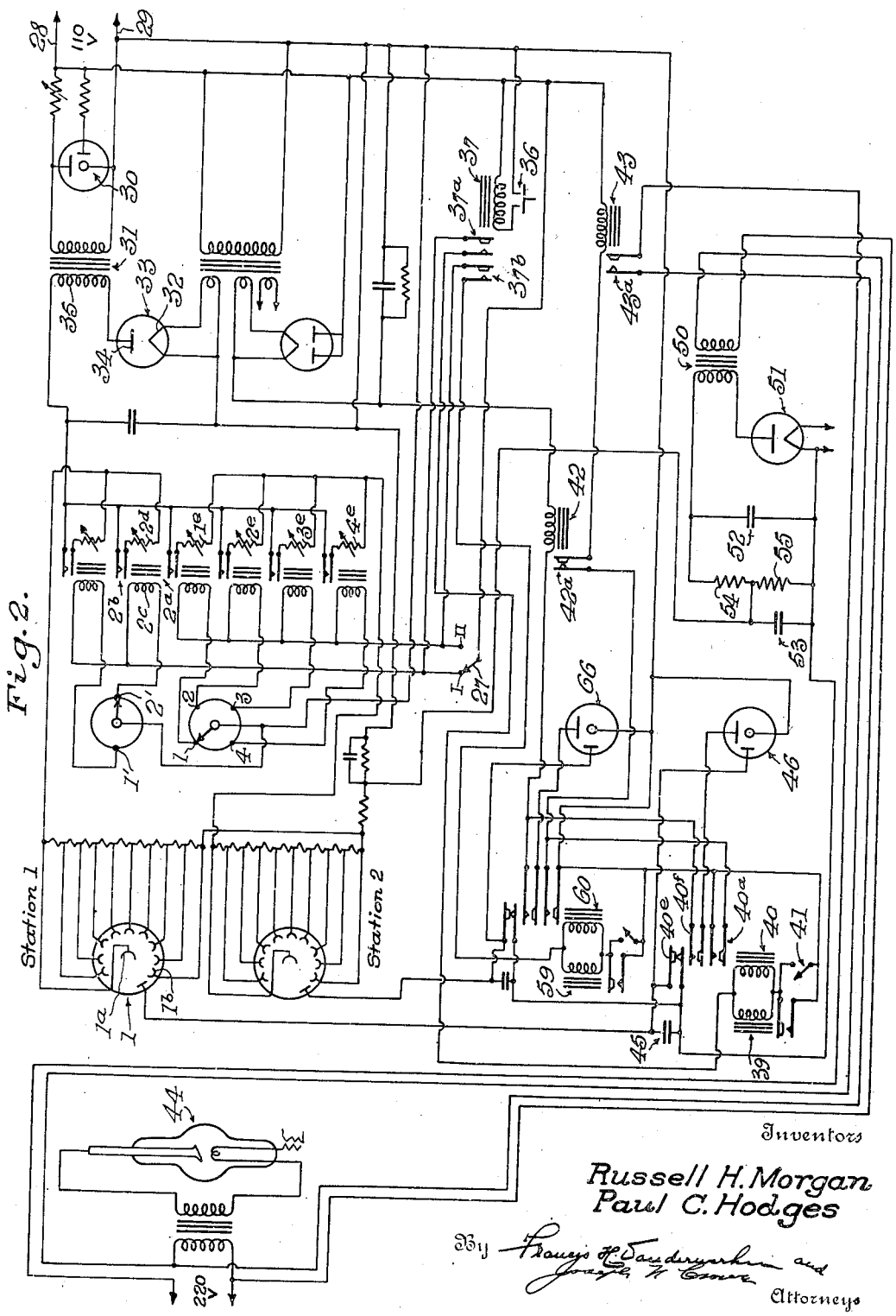

Patented Nov. 15, 1949

2,488,315

UNITED STATES PATENT OFFICE 2,488,315

EXPOSURE SELECTING DEVICE FOR X-RAY APPARATUS

Russell H. Morgan and Paul C. Hodges, Chicago, Ill., assignors to United States of America as represented by the Secretary of War Application May 15, 1946, Serial No. 669,817

8 Claims. (Cl. 250—95)

This invention relates generally to X-ray photographic apparatus but more particularly to a selective timing device for controlling the period of exposure of a film in accordance with the opacity of the object photographed at several stations.

One object of the invention is to provide an accurate and rapidly operated apparatus for automatically timing an exposure when photographing any portion of an anatomical structure at each of the several stations.

Another object of the invention is to provide an apparatus of the class described wherein sensitivity of the photoelectric detector may be adjusted in accordance with the non-uniform opacity of the object photographed and the sensitivity of the film.

Another object of the invention is to provide a selective exposure control device which may be operated with two or more stations in which patients may be positioned in either upright or reclining postures in order to obtain the most desirable photographs of anatomical structures of non-uniform density.

Other objects and advantages of the invention relating to the particular construction and arrangement of the various parts, will become apparent as the description proceeds. Referring to the drawings in which like parts are indicated by similar reference characters:

Fig. 1 is an elevational view illustating the manner of photographing patients at two stations, when using a single X-ray tube;

Fig. 2 is a diagrammatic view indicating the various parts of an apparatus included in the device illustrated in Fig. 1, and shows the circuit for the detector unit and the condenser thyratron relay system;

Fig. 3 is a top plan view of the occulting disc for station I;

Fig. 4 is a bottom plan view of the distributor disc for station I;

Fig. 5 is a top plan view of the occulting disc for station II;

Fig. 6 is a bottom plan view of the distributor disc for station II; and

Fig. 7 is a detail vertical section of the occulting mechanism.

In general the apparatus consists of either one or two X-ray tubes and two automatic photometers. These photometers each consist of two parts—a detector unit and a condenser thyratron relay system which for convenienec is called the control chassis.

Referring to Fig. 1, which illustrates an apparatus using a single X-ray tube, the numeral 10 indicates an adjustable X-ray tube support housing for inclosing various parts of the apparatus shown in the diagram in Fig. 2.

Within the X-ray tube support housing is mounted an adjustable upright or standard 11 which may be retained at any desired height by the set screw 12, and which supports at its upper end an angularly adjustable yoke 13 in which the X-ray tube housing 14 is mounted. The adjustments illustrated allow a beam of X-rays from the tube within the housing 14 to be directed either in a vertical or horizontal direction or at any desired angle.

The photographic units 15 and 15' of station I and station II as illustrated in Fig. 1, each comprises a reciprocatory Bucky grid 16 and 16' as completely described in copending application Serial No. 495,690, entitled X-ray apparatus, filed July 22, 1943, now Patent 2,467,592. Adjacent the Bucky grid are located the film trays 17 and 17' and adjacent the film trays are located occulting assemblies 18 and 18' including distributing mechanisms 19 and 19' as fully described in copending application Serial No. 669,818, entitled Radiation responsive unit, filed May 15, 1946, now Patent 2,441,324.

The occulting devices at stations I and II each consists of discs 21 and 21' which are provided with a plurality of occulting plates 22 and 22' which may be rotated into the path of the X-rays so as to effect an advantageous distribution of the X-rays over the sensitized surface of the film so that for objects of non-uniform density the film will receive sufficient rays at localities which best serve to illustrate on the finished photograph parts of the object which would otherwise be partially or totally occulted due to the opacity.

The distributing mechanism which forms part of the occulting assembly at each station comprises non-rotatable contact discs 23 and 23' placed below the occulting plates which are provided with contact buttons 24 and 24' corresponding to the occulting plates on the discs 21 and 21' and below the contact discs 23 and 23' are mounted rotatable grounding arms 25 and 25' which are adapted to be brought into contact with selected buttons on the contact discs 23 and 23' to complete circuits through resistances in the photo-tube circuit as will further be described.

A detailed description of the above apparatus will be found in the copending application Serial No. 669,818.

The detector units 26 and 26' comprise light-proof metal boxes provided with covers that are transparent to Roentgen rays and contain phototubes of the multiplier type, a fluorescent screen, and a reflector, which are also described in the copending application mentioned above.

In the operation of the device the station must first be selected. If the patient is to be photographed in an upright position the selector switch 27 is placed on the contact for station I, or wall X-ray, and if the patient is to be photographed in a reclining position the switch 27 is placed on the contact for station II, or table X-ray.

After having selected the station, the distribution of the rays should next be considered and, when it is determined which occulting plate on disc 21 it is desired to use for the photograph, the disc is turned until the proper stop in the disc retains the plate selected on the optical axis of the rays. The occulting discs 21 and 21' and grounding arms 25 and 25' of the distributing mechanism rotate as a unit, so that when the proper occulting plate is brought into the X-ray beam a corresponding resistance is connected in the phototube circuit by contact of the grounding arm with a contact button on the contact or resistance selector discs 23 and 23' which operate a relay as described below.

If station I and stop 2' of the occulting disc 21' are selected, the switch 27 will be turned to contact I and the grounding bar or arm 25 of the resistance selector will contact the corresponding button on the contact disc 23' to complete a circuit from the power lines 28 and 29 through the field coil 2c of relay 2a and thus operate switch 2b to close the circuit including variable resistance 2d. This circuit includes cathode 1a and the ninth dynode 1b of the phototube 1 and derives its energy from the power lines 28 and 29 through the voltage regulator 30 and transformer 31.

Upon energization of the relay 2a, switch 2b is closed and a circuit is completed through the variable resistance 2d, cathode 1a of the photoelectric tube 1, and from the ninth dynode 1b of said tube to the cathode 32 of rectifier 33 and from the anode 34 of the rectifier to the secondary coil 35 of the step-up transformer 31 and back to switch 2b.

The resistance 2d is gauged according to the sensitivity of the film used and the amount of X-rays which pass through the occulting plate at stop 2'. The primary of the transformer 31 is connected to the cathode and plate of the voltage regulator tube 30 and to the power lines 28 and 29 and the grid of the voltage regulator tube 30 is connected to power line 28. After the selection of the station and the occulter plate is completed as described above, the exposure switch 36 is closed. Upon closure of this switch a circuit from the power lines 28 and 29 effects the energization of relay 37 which effects the closure of switch 37a and the energization of relays 39 and 40 and therefore if the grid has just reversed its position in its reciprocatory movement, as set forth in copending application Serial No. 666,903, entitled Reciprocator for X-ray apparatus, filed May 3, 1946, the grid switch 41 will be closed and a circuit will be completed through switch 40a, normally closed switch 42a and relay 43 to the power line 28. The energization of relay 43, which is the large contactor, closes switch 43a thus causing the energization of the X-ray tube 44.

When Roentgen rays fall on the fluorescent screen of the detector, it emits visible light which causes the phototube to conduct a small electrical current. The magnitude of this photo current is proportional to the light emitted by the screen, and therefore to the intensity of the Roentgen rays that induced the visible radiation. The photo current enters the control chassis where it is collected by a condenser 45 and when the charge on this condenser reaches a critical value the thyratron 46 ionizes and activates the normally closed relay 42 which in turn interrupts the Roentgen-ray exposure.

The time required for charging the condenser determines the length of the exposure and varies with the voltage applied to the phototube, the size of the condenser and the intensity of the radiation reaching the detector.

When the station switch 27 is thrown to station I, current is supplied to the phototube and the reciprocating grid is set in operation; the stage is now set for an exposure. When now the operating push button 36 is in circuit closing position relay 37 is energized and its two normally open contacts 37a and 37b close. One pair of these contacts carries no current because the station II tube is not in circuit but the other pair receives 110 volts A. C. from the power lines 28 and 29 and delivers it to one side of the coils of relays 39 and 40. Since station I grid is now in motion, relays 39 and 40 are receiving pulses of ground whenever the grid begins to travel in a new direction; and with the first of these pulses following the closing of the operating push button relays 39 and 40 close and provide a permanent ground or closed circuit so long as the operating push button is held closed.

Relay 40 has three pairs of contacts, 40a, 40b and 40c. 40c is normally closed, and 40a and 40b normally open. Opening the normally closed contacts 40c takes the short off of the station I condenser 45, and closing the two pairs of normally open contacts 40a and 40b starts the Roentgen-ray exposure and puts station I thyratron 46 in circuit with the coil of relay 42. When the thyratron fires, relay 42 closes, opening its single pair of normally closed contacts 42a and thus terminating the exposure.

An X-ray tube compensating circuit is provided which is coupled to the transformer 50, and which includes the rectifier tube 51, condensers 52 and 53 and resistances 54 and 55. This circuit is arranged so that raising the voltage at the kilovolt meter of the Roentgen-ray machine decreases the sensitivity of the photometer, while lowering that voltage increases its sensitivity, thus compensating for the effect of voltage change on the amount of radiation absorbed by the rear screen, the back of the cassette and the cover of the detector.

In the above description the operation of only one station, namely station I with the occulting disc set at stop 2' has been described. Since both stations I and II with any of the stops on their respective occulting discs and resistance selectors operate in a similar manner it is deemed unnecessary to describe any others.

In station II the phototube 2 corresponds to the phototube 1 in station I, relays 59 and 60 correspond to relays 39 and 40, and thyratron 66 corresponds to thyratron 46. The disc 18' of station II has four occulting plates whereas the disc 18 of station I has only two, and for every stop on the disc 18 a corresponding relay and variable resistance coils are provided; these resistances are indicated by the reference characters 1e, 2e, 3e and 4e. For station II the main relays 37, 42 and 43 operate in a similar manner to those in station I.

Having thus described our invention, what we claim as new and wish to secure by Letters Patent is:

1. An exposure selecting device for X-ray apparatus comprising a single source of X-ray radiation, power control circuits connected with said source of X-ray radiation, including relay operated switches for controlling the operation of said source of radiation, dual photographic stations each including a film holder and a film mounted in said holder, means in connection with said source of radiation for directing said X-rays to either of said stations, occulting means in connection with each of said stations for transmitting and occulting rays in predetermined localities for the selective distribution of said X-rays in accordance with the varying opacity of the object photographed, and detecting means for controlling the duration of exposure of said films in accordance with the average opacity of the object photographed, and a thyratron circuit associated with said detecting means, including a shunted condenser and a relay operated switch adapted to open said shunt to allow an increase in the capacity of the condenser to the firing point of the thyratron and thereby control the exposure period of the film.

2. An exposure selecting device for X-ray apparatus comprising a single source of X-ray radiation, power control circuits connected with said source of X-ray radiation, including relay operated switches for controlling the operation of said source of radiation, dual photographic stations each including a film holder and a film mounted in said holder, means in connection with said source of radiation for directing said X-rays to either of said stations, occulting means in connection with each of said stations, said occulting means comprising a plurality of lead plates mounted upon a rotatable disc and adapted to be selectively interposed in the beam of said X-rays and provided with selectively distributed openings to effect the distribution of said X-rays in accordance with the non-uniform opacity of the object photographed, and detecting means for controlling the duration of exposure of said films in accordance with the average opacity of the object photographed, and a thyratron circuit associated with said detecting means, and said thyratron circuit including a shunted condenser and a relay operated switch adapted to open said shunt to allow an increase in the capacity of the condenser to the firing point of the thyratron and thereby control the exposure period of the film.

3. An exposure selecting device for X-ray apparatus comprising a single source of X-ray radiation, power control circuits connected with said source of X-ray radiation, including relay operated switches for controlling the operation of said source of radiation, dual photographic stations each including a film holder and a film mounted in said holder, means in connection with said source of radiation for directing said X-rays to either of said stations, occulting means including substantially opaque plates, provided with selectively located openings in connection with each of said stations for the selective distribution of said X-rays in accordance with the varying opacity of the object photographed, detecting means for controlling the duration of exposure of said films, and selecting means associated with said occulting means for varying the sensitivity of said detecting means proportionate with the opacity of the selected occulting means for the object to be photographed, and a thyratron circuit associated with said detecting means, said circuit including a shunted condenser, a relay operated switch adapted to allow an increase in the capacity of the condenser to the firing point of the thyratron and thereby control of the power circuit to affect the proper exposure period.

4. An exposure selecting device for X-ray apparatus comprising a single source of X-ray radiation, power control circuits connected with the source of X-ray radiation including relay operated switches for controlling the operation of said source of radiation, dual photographic stations each including a film holder and a film mounted in said holder, means in connection with said source of radiation for directing said X-rays to either of said stations, occulting means including a plurality of lead plates provided with selectively located openings therein and mounted upon a disc and adapted to be rotated into the path of said X-rays to effect the distribution thereof in accordance with the varying opacity of the object photographed, and detecting means including a phototube in connection with a condenser-thyratron-relay circuit, for controlling the duration of exposure of said films in accordance with the intensity of the impinging rays on the sensitized surface of the film after traversing said occulting means, and means for limiting the duration of the exposure of said film dependent on the X-rays received through said opening.

5. An exposure selecting device for X-ray apparatus comprising a single source of X-ray radiation, power control circuits connected with said source of X-ray radiation, dual photographic stations each including a film holder and a film mounted in said holder, means in connection with said source of radiation for directing said X-rays to either of said films, occulting means in connection with each of said stations including opaque plates provided with selectively spaced perforations and mounted upon rotatable discs so that the plates may be rotated into the path of the X-rays for the selective distribution of said X-rays in accordance with the varying opacity of the object photographed, detecting means including a condenser-thyratron-relay circuit for controlling the operation of the X-ray power circuit and thereby limit the duration of exposure of said films, and selecting means including a plurality of variable resistors associated with said detecting means for varying the sensitivity of said detecting means proportionate with the opacity of the selected occulting means for the object to be photographed.

6. A system of the character described for automatically taking Roentgenographs of proper exposure at different stations and comprising an X-ray tube, a pair of electrically related Roentgenograph stations adapted to be served selectively by said X-ray tube, each of said stations comprising occulting means including opaque plates, perforated in predetermined localities, mounted upon a rotatable disc, and adapted to intercept the beam of said X-rays to effect the selective distribution of radiation from said X-ray tube in accordance with the varying opacity of the object photographed, a radiation detector including a fluorescent screen and a photoelectric cell positioned to receive Roentgen radiation from the X-ray tube after said radiation traverses the Roentgen film, said detector having a response proportional to the intensity of the radiation effective in exposing the Roentgen film, a capacitator in circuit with said cell adapted to be progressively charged, means responsive to the potential of said capacitator corresponding to a proper exposure of the Roentgen film for deenergizing said X-ray tube, a source of potential, and means in electrical relation with the X-ray tube, the respective stations and said source of potential for distributing potential to the X-ray tube and to said stations, said means including an exposure switch for initiating the exposure period of said X-ray tube and a selector switch for selecting the desired station, and a relay operated switch in circuit with said capacitator to limit the exposure period.

7. A radiation responsive system adapted to be used in connection with an apparatus for automatically taking Roentgenographs of proper exposure comprising in combination a source of exposure comprising in combination a source of Roentgen radiation, a radiation detector having a response proportional to the intensity of radiation effective in exposing the Roentgen film, said detector being positioned to receive the radiation after it has traversed the Roentgen film and including a fluorescent screen and a photoelectric cell operatively disposed with respect to said screen, occulting means, including selectively perforated occulting plates associated with said detector for varying the radiation incident at the surface of the screen and additional means including a group of various resistances and a condenser thyratron system, controlled by the first-mentioned means for adjusting the sensitivity of the photoelectric cell in accordance with the variation of said incident radiation, and for extinguishing the X-rays on completion of sufficient exposure of the film.

8. A radiation responsive system adapted to be used in connection with an apparatus for automatically taking Roentgenographs of proper exposure comprising in combination a source of Roentgen radiation, a grid mounting disposed beneath said source of radiation, a reciprocatory grid carried by said mounting, a Roentgen film support beneath said grid, said support being formed with an aperture for the passage of radiation, a radiation detector underlying said Roentgen film support and adapted to receive radiation after it traverses the film, the response of said detector being proportional to the intensity of the radiation effective in exposing a Roentgen film, said detector embodying a housing, a photoelectric cell within said housing, a fluorescent screen positioned within said housing and reflector means positioned beneath said screen so that said photoelectric cell will receive a mirrored image of the screen, occulting means associated with said detector for varying the radiation incident upon the surface of said screen, said means including a plurality of variously perforated plates adapted to be secured selectively in operative position above the screen and immediately below the opening in said film support and additional means including a group of resistances of various values coacting with and controlled by said occulting means for adjusting the response of said photoelectric cell in accordance with the variation of incident radiation effected by said stops, and a condenser thyratron relay system adapted to extinguish the X-rays upon completion of the exposure of the film.

RUSSELL H. MORGAN.
PAUL C. HODGES.

REFERENCES CITED

The following references are of record in the file of this patent:

UNITED STATES PATENTS

| Number | Name | Date |
| --- | --- | --- |
| 1,599,434 | Rose | Sept. 14, 1926 |
| 2,225,940 | Grossmann | Dec. 24, 1940 |
| 2,257,050 | Goldfield | Sept. 23, 1941 |
| 2,258,593 | Black | Oct. 14, 1941 |
| 2,401,288 | Morgan et al. | May 28, 1946 |
| 2,405,444 | Moreau et al. | Aug. 6, 1946 |

OTHER REFERENCES

"The Automatic Control of Exposure in Photofluorography," by R. H. Morgan, Public Health Report, Oct. 15, 1943, vol. 58, No. 42, pp. 1533–1541. (Copy in Patent Office Library.)